Patented May 18, 1954

2,678,922

UNITED STATES PATENT OFFICE 2,678,922

STABLE LIQUID CHLORINE DIOXIDE COMPOSITION

William A. Stone, Niagara Falls, N. Y., assignor to Mathieson Chemical Corporation, a corporation of Virginia No Drawing. Application December 28, 1951, Serial No. 263,955

4 Claims. (Cl. 252—187)

The present invention relates to chlorine dioxide and provides improvements in its handling, storing, and use. It also provides an improved, stable liquid chlorine dioxide composition.

Chlorine dioxide is extensively used in a number of industries. Its use has, however, been subject to the disadvantage that, under usual conditions, it is quite unstable. For this reason, it has been necessary to generate the chlorine dioxide at the place of use in very low concentrations and only in amounts immediately required. The generation of chlorine dioxide may, for instance, be effected advantageously by reacting chlorine gas with a chlorite, the chlorine gas used being highly diluted with an inert gas to act as a diluent for the generated $ClO_2$.

The generation of chlorine dioxide at the place of use has generally proved satisfactory but, in some instances, it is highly desirable that the chlorine dioxide be prepared in some stable form suitable for shipping and storing, for instance, where the requirement of chlorine dioxide does not justify the expense of installing a chlorine dioxide generator.

Chlorine dioxide in liquid form has been recognized as an extremely dangerous material because of its highly explosive nature. Even in gaseous form, chlorine dioxide must be diluted with some gas, inert with respect to chlorine dioxide, to a partial pressure not in excess of about 30 millimeters of mercury for safe handling. At partial pressures in excess of about 70 millimeters of mercury, the handling of gaseous chlorine dioxide mixtures is extremely hazardous.

In conventional practice, as indicated above, chlorine dioxide gas is frequently generated by passing chlorine gas in admixture with an inert gas, for instance, air or nitrogen, in contact with sodium chlorite, the chlorine reacting with the chlorite to liberate chlorine dioxide and the air, for instance, serving to dilute the chlorine dioxide to the required concentration.

So far as I am aware, chlorine dioxide has not heretofore been available in liquid form for practical use because of its unstable, explosive nature.

I have discovered, quite unexpectedly, that chlorine dioxide may be prepared in a stable liquid form which, with only moderate precautions, may with safety be handled and stored.

In accordance with the present invention, I prepare liquid chlorine dioxide in admixture with liquid chlorine. The proportion of chlorine and chlorine dioxide may be varied somewhat so long as the proportion of chlorine dioxide in mixtures to be maintained at reduced temperatures does not exceed one part $ClO_2$ for each two parts $Cl_2$ by weight. At normal temperatures the proportion of chlorine dioxide should not exceed about 27% of the total weight of the mixture. Concentrations of liquid chlorine dioxide in liquid chlorine in excess of 27% by weight have been found to be unstable and to explode when subject to underliquid sparking at a temperature of 25° C. and, accordingly, are not considered safe to handle or store except under low temperature conditions.

At concentrations as high as about 27%, chlorine dioxide, while safe to handle, has been found to be unstable to the extent of decolorizing at about 40° C. However, chlorine-chlorine dioxide concentrations containing 5–20% chlorine dioxide by weight have been found to be useful and to be stable even at temperatures as high as 50° C.

The stable liquid chlorine dioxide composition of my present invention is suitable for use in many, if not all, instances where chlorine dioxide is now used and where the presence of chlorine in admixture with the chlorine dioxide is not objectionable. The lower limit of chlorine dioxide in the mixture is fixed only by a practical consideration. For instance, in the bleaching of pulp, mixtures of chlorine and chlorine dioxide may be advantageously used, even when the concentration of chlorine dioxide in the mixture is as low as 5–8%. Even lower proportions of chlorine dioxide may be used where warranted from a practical consideration. Under certain conditions it may be desirable to use a proportion of chlorine dioxide even less than 5%, but from practical and economic considerations there presently appears to be no practical advantage in the use of compositions containing less than about 5% chlorine dioxide. Compositions containing such lesser proportions of chlorine dioxide may readily be prepared, as indicated herein, are stable, and are within the contemplation of the present invention but, from a practical standpoint, the composition of my invention will contain at least an effective proportion of liquid chlorine dioxide.

Liquid chlorine and liquid chlorine dioxide have been found to be miscible in all proportions. However, the boiling point of chlorine is about −34.6° C. while the boiling point of chlorine dioxide is about 10° C. at atmospheric pressure. It does not appear that any constant boiling azeotrope is formed. Therefore, in the handling of the mixture, it is necessary to avoid separation of chlorine from the liquid to such an extent as to increase the concentration of chlorine dioxide to above that at which the mixture may be safely handled under temperature conditions likely to be encountered.

The presence of small proportions of water vapor in the chlorine-chlorine dioxide mixture does not appear to be objectionable. In fact, a mixture which is not completely anhydrous appears to be somewhat more stable than a completely anhydrous mixture.

The stability of a liquid mixture of chlorine dioxide and chlorine will depend primarily upon the concentration of chlorine dioxide in the mixture, as noted above, and also the temperatures to which the mixture is to be exposed. Consequently, where the mixture is to encounter only very low temperatures, the concentration of chlorine dioxide may be somewhat greater than those indicated above as being safe at normal temperatures.

For instance, a liquid mixture of about ⅓ liquid chlorine dioxide and ⅔ liquid chlorine was tested at temperatures of —56° C., —43° C., and —41° C. by passing a submerged spark through the liquid. Under these conditions, no explosion nor visible decomposition occurred. On the other hand, dry chlorine dioxide unmixed with chlorine is solid at —65° C. and, when sparked, explodes violently. As the temperature to be encountered increases, progressively higher proportions of liquid chlorine are required in order to render the liquid chlorine dioxide stable.

The mixture of liquid chlorine dioxide-liquid chlorine of my present invention may be prepared in any known manner for generating and liquefying the two gases which does not involve the generation and handling of dangerous concentrations of chlorine dioxide under the existing temperature and pressure conditions. Advantageously, one may generate a mixture of chlorine dioxide and air, or other inert gas, and condense the chlorine dioxide from the mixture in contact with the liquid chlorine. This may, with advantage, be accomplished by passing the chlorine dioxide gas mixture into liquid chlorine, cooled to a temperature of —30° C.

For example, chlorine dioxide was generated by passing a mixture of chlorine and air through an aqueous solution of sodium chlorite, the effluent gases washed with sulfuric acid to remove water vapor and the resultant gas consisting essentially of chlorine dioxide and air was led into a body of liquid chlorine, cooled with solid carbon dioxide and chloroform. The chlorine dioxide was condensed and mixed with the liquid chlorine to form an orange-red liquid. Continued addition of the chlorine dioxide did not form a second phase. The two liquids appear to be miscible in all proportions.

A spark has been passed between platinum points submerged in a liquid composed of one part chlorine dioxide to two parts liquid chlorine, without causing the mixture to explode. At atmospheric pressure a volume of liquid chlorine, even less than twice the volume of the liquid chlorine dioxide admixed therewith, has been found to prevent explosion of the mixture at temperatures at least up to —39° C.

As the temperature of the mixture increases, it is necessary to increase the proportion of liquid chlorine to liquid chlorine dioxide above the two to one limit in order to obtain a stable mixture. At 25° C. a solution containing 12.7% chlorine dioxide in liquid chlorine was found not to explode upon repeated passage of a submerged spark therethrough. But where the proportion of chlorine dioxide was raised to 30% by weight, the mixture was found to be violently explosive at 25° C.

In the complete absence of organic reducing compounds, dry liquid chlorine dioxide is miscible with dry liquid chlorine under its own pressure at temperatures up to 40° C. and at concentrations below 27% chlorine dioxide by weight, the mixture cannot be exploded by a submerged spark at that temperature. The upper limit of safe composition corresponds to an available chlorine ratio of 1.13 parts available chlorine as liquid chlorine to 1 part available chlorine as chlorine dioxide.

As previously indicated, caution should be exercised in the use of the liquid to avoid excessive concentrations of the chlorine dioxide by reason of loss of the more volatile chlorine. Once the liquid chlorine dioxide-chlorine mixture has been introduced into an aqueous solution, for instance, a bleaching bath, the danger of explosion is minimized and danger of explosion no longer exists where reasonable operating precautions are exercised.

I claim:

1. A chlorine dioxide composition consisting essentially of a mixture of liquid chlorine dioxide and liquid chlorine in proportions by weight not exceeding one part of chlorine dioxide for each two parts of chlorine.

2. A chlorine dioxide composition consisting essentially of a mixtrue of liquid chlorine dioxide and liquid chlorine the proportion of chlorine dioxide therein being within the range extending from about 5% to 27% by weight, based on the total weight of chlorine dioxide and chlorine.

3. A chlorine dioxide composition consisting essentially of liquid chlorine dioxide in admixture with liquid chlorine and in which the proportion of chlorine dioxide is within the range of 5–20% by weight based on the total weight of chlorine dioxide and chlorine.

4. A chlorine dioxide composition consisting essentially of a mixture of liquid chlorine dioxide and liquid chlorine in proportions by weight not exceeding one part of chlorine dioxide for each two parts of chlorine, the said composition comprising at least about 5% by weight of liquid chlorine dioxide.

References Cited in the file of this patent

UNITED STATES PATENTS

| Number | Name | Date |
| --- | --- | --- |
| 2,280,938 | Vincent | Apr. 28, 1942 |